(12) United States Patent
Landesmann

(10) Patent No.: US 7,305,447 B2
(45) Date of Patent: Dec. 4, 2007

(54) SYSTEM AND METHOD FOR GRANTING DEPOSIT-CONTINGENT E-MAILING RIGHTS

(75) Inventor: Mark Landesmann, San Francisco, CA (US)

(73) Assignee: Buyerleverage Email Solutions LLC, Palo Alto, CA (US)

( * ) Notice: Subject to any disclaimer, the term of this patent is extended or adjusted under 35 U.S.C. 154(b) by 134 days.

(21) Appl. No.: 11/060,549

(22) Filed: Feb. 18, 2005

(65) Prior Publication Data

US 2005/0144244 A1   Jun. 30, 2005

Related U.S. Application Data

(63) Continuation of application No. 09/984,884, filed on Oct. 31, 2001, now Pat. No. 7,072,943.

(60) Provisional application No. 60/244,609, filed on Nov. 1, 2000.

(51) Int. Cl.
*G06F 15/16* (2006.01)

(52) U.S. Cl. .................. 709/206; 709/203; 709/207; 705/14; 705/400

(58) Field of Classification Search ............ 709/203, 709/206–207; 705/14, 39–40, 400
See application file for complete search history.

(56) References Cited

U.S. PATENT DOCUMENTS

| | | | |
|---|---|---|---|
| 4,935,956 A | | 6/1990 | Hellwarth et al. |
| 5,508,817 A | | 4/1996 | Kunigami |
| 5,764,899 A | * | 6/1998 | Eggleston et al. ......... 709/203 |
| 5,794,210 A | | 8/1998 | Goldhaber et al. |
| 5,828,737 A | | 10/1998 | Sawyer |
| 5,855,008 A | * | 12/1998 | Goldhaber et al. ......... 705/14 |
| 5,999,967 A | | 12/1999 | Sundsted |
| 6,023,723 A | | 2/2000 | McCormick et al. |
| 6,052,709 A | | 4/2000 | Paul |
| 6,072,942 A | * | 6/2000 | Stockwell et al. ......... 709/206 |
| 6,101,485 A | * | 8/2000 | Fortenberry et al. ....... 705/27 |

(Continued)

FOREIGN PATENT DOCUMENTS

WO    99/29099    6/1999

OTHER PUBLICATIONS

Technical Forum, IBM Systems Journal, vol. 41, No. 4, 2002, pp. 759-766.

(Continued)

*Primary Examiner*—Saleh Najjar
*Assistant Examiner*—Shawki S Ismail
(74) *Attorney, Agent, or Firm*—Foley & Lardner LLP

(57) ABSTRACT

An Email guarantee deposit method, system, and program product, with the method comprising in one embodiment, the steps of: receiving from a sender a request to send to a recipient an Email; receiving a deposit or an authorization to obtain a deposit of something of value; sending the Email to the recipient only if a deposit of authorization for a deposit is received; determining if the recipient has accepted the deposit; and if the recipient has accepted the deposit, then facilitating the disposal of the deposit. In an important alternate embodiment, a deposit can be required before an Email with a auditory or visual enhancement is provided, or before routing to a designated type of device occurs.

48 Claims, 4 Drawing Sheets

U.S. PATENT DOCUMENTS

| | | | |
|---|---|---|---|
| 6,101,531 A * | 8/2000 | Eggleston et al. | 709/206 |
| 6,167,434 A | 12/2000 | Pang | |
| 6,192,114 B1 | 2/2001 | Council | |
| 6,199,102 B1 | 3/2001 | Cobb | |
| 6,209,095 B1 | 3/2001 | Anderson et al. | |
| 6,393,464 B1 | 5/2002 | Dieterman | |
| 6,421,709 B1 | 7/2002 | McCormick et al. | |
| 6,484,197 B1 | 11/2002 | Donohue | |
| 6,587,550 B2 | 7/2003 | Council et al. | |
| 6,697,462 B2 | 2/2004 | Raymond | |
| 6,741,969 B1 * | 5/2004 | Chen et al. | 705/14 |
| 7,072,942 B1 * | 7/2006 | Maller | 709/206 |
| 7,072,943 B2 * | 7/2006 | Landesmann | 709/206 |
| 2001/0023432 A1 | 9/2001 | Council et al. | |
| 2002/0052855 A1 | 5/2002 | Landesmann | |
| 2002/0165898 A1 * | 11/2002 | Duffy et al. | 709/102 |
| 2002/0169954 A1 * | 11/2002 | Bandini et al. | 713/153 |
| 2003/0009285 A1 * | 1/2003 | Picone et al. | 702/2 |
| 2003/0023736 A1 | 1/2003 | Abkemeier | |
| 2003/0086543 A1 | 5/2003 | Raymond | |
| 2003/0114157 A1 * | 6/2003 | Spitz et al. | 455/435 |
| 2004/0122730 A1 * | 6/2004 | Tucciarone et al. | 705/14 |
| 2004/0165707 A1 | 8/2004 | Raymond | |
| 2004/0230531 A1 | 11/2004 | Weiss | |
| 2005/0086365 A1 | 4/2005 | Urro | |
| 2005/0192819 A1 | 9/2005 | Smith et al. | |
| 2005/0193075 A1 * | 9/2005 | Haff et al. | 709/206 |
| 2005/0198174 A1 | 9/2005 | Loder et al. | |
| 2005/0198176 A1 | 9/2005 | Landesmann | |
| 2006/0026107 A1 | 2/2006 | Urro | |
| 2006/0080395 A1 | 4/2006 | Landesmann et al. | |
| 2007/0022007 A1 * | 1/2007 | Lawe | 705/14 |
| 2007/0083433 A1 * | 4/2007 | Lawe | 705/14 |

OTHER PUBLICATIONS

Dwork, C. et al., "Pricing Via Processing or Combatting Junk Mail," pp. 1-11, date unknown.

Krishnamurthy et al., "SHRED: Spam Harassment Reduction via Economic Disincentives," AT&T Labs-Research, Eureka! Computing Solutions, Inc., pp. 1-14.

Nail et al., "The Real Answer to the Spam Problem," Whole View, Tech Strategy Research, Dec. 10, 2003, pp. 1-5.

* cited by examiner

SYSTEM AND METHOD FOR GRANTING DEPOSIT-CONTINGENT E-MAILING RIGHTS

CROSS-REFERENCE TO RELATED APPLICATIONS

This application is a continuation of application Ser. No. 09/984,884 filed on Oct. 31, 2001 now U.S. Pat. No. 7,072,943. The '844 application claims the benefit of priority under 35 U.S.C. § 119(e) of provisional application Ser. No. 60/244,609 entitled "MyStealthMail" filed on Nov. 1, 2000, the disclosure of which is hereby incorporated by reference in its entity.

FIELD OF THE INVENTION

The present invention relates generally to the field of network and Internet communications, and more particularly to the field of automatic Email control.

BACKGROUND OF THE INVENTION

Jupiter Media Metrix predicts that the average Email address will receive 40 times as many Emails as it is receiving now by the year 2005. Even at current levels, consumers show a concern about protecting their Email inboxes against unwanted Email (hereafter referred to as "spam"). At the same time consumers must constantly relinquish their Email address to third parties in the course of availing themselves of the many products and services that are offered on the Web. Individuals also find it necessary or useful to communicate with many private individuals by Email temporarily, yet do not necessarily wish to grant these individuals long-term access to their Email inbox. But reviewing and discarding commercial Emails takes time and effort and many individuals resent their inability to shield themselves against this unwanted intrusion.

Many people like or need to be immediately notified when Emails come in, and enable features in their Email application that provide them with visual or auditory signals to alert them of an incoming Email. To those individuals the unwanted interruption of unwanted Email is even more bothersome. In addition, wireless devices have limited screen space, lower memory storage and longer download times, which all work to increase the productivity costs of unwanted Email.

A key problem which results from spam is that people are reluctant to publish their Email addresses in publicly available directories. Indeed, individuals who list their Email address in a public directory are likely to receive many additional unwanted commercial Emails. Spammers can simply retrieve their Email address from these public listings and use them to send commercial Email messages. Consumers who evade these spammers by declining to list their Email address in a public directory, also make their Email address unavailable to those who do not have their Email address, but might have a legitimate interest in contacting them. Contacting people by telephone is not always possible, because many numbers are not listed or otherwise not available. Even when it is possible, contacting people by phone to ask them for their Email address is inconvenient.

None of the current technologies and methods which allow consumers to protect themselves against unwanted Email, hold the promise of combating spam effectively enough to allow consumers to publish their Email addresses publicly. Such technologies described as follows:

Opt-In and Unsubscription

Some businesses especially those that regularly send third party advertisements by Email to a group of opt-in Email subscribers allow these subscribers to opt-out by replying to an Email or clicking on a link in the Email. However many companies do not. In addition, of the companies that do many reserve the right to change their privacy policies, and some release their Email addresses to third parties in the course of conducting business, even if their privacy policy says that will not do so.

And:

Most privacy policies allow for Email addresses to be disclosed to third parties or to be sold or exchanged with business partners.

Even a binding promise not to sell or disclose an Email address to a third party does not survive company bankruptcy.

Many companies have insufficient safeguards against unauthorized or accidental disclosure of their consumer's Email addresses.

Most importantly, even if a majority of companies voluntarily refrain from sending volume Emails, and take proper safeguards against unauthorized disclosure, advances in technology allow even a small group of spammers to send many hundreds of millions of unwanted Emails and to sell Email addresses to other spammers.

Legislation which would mandate that companies abide by the privacy policies that they publish may be passed in the future, but no legislation that generally prohibits sending Email to individuals who have not expressly given permission to receive such Email is expected due to first amendment concerns. Also any legislation would be difficult to enforce on the Internet due to its global reach and the ability to send Email messages from virtually anywhere outside the United States.

Hotmail and other Email providers allow consumers to "block senders" i.e. to block Emails coming from a particular Email address/outbox. However, senders can change their outgoing Email address at will so that this mechanism is not effective.

Some providers also refer Emails that are sent to multiple recipients on the same network to a separate Bulk Email folder. The problems with this mechanism are Some Emails that are sent to multiple recipients are either private Emails that are sent by individuals to multiple recipients, or wanted newsletters or bulk Emails sent by businesses. Therefore, the Email recipient must still periodically review this folder as well for wanted Emails.

Technology exists currently, and is likely to be further developed, that allows senders to send Emails to many recipients in an reiterative process which simulates individual mailings. While there may be other technologies to counteract this, it is likely that the technologies of spammers and those that seek to confound them will continue to leapfrog each other. Few, if any, analysts predict that the outcome of this technological race will be spam-free Email inboxes.

Yet another method of protecting consumers against unwanted Email is the blacklisting of senders and their IP addresses. Programs exist that block Emails from blacklisted senders. Internet service providers such as Abovenet and UUnet exercise pressure on their business consumers to adopt strict opt-in Email policies. But as noted above, spammers can switch internet service providers and/or Email addresses to evade detection and blocking of their Emails.

Yet another method of protecting consumers against unwanted Email is for the content of the Emails to be screened by artificial intelligence based software programs. Depending on the content and which words or phrases are found in the Email, Emails are then either blocked or routed to less important folders which the user is presumed to check less frequently. The problems with this method are Spammers can easily avoid the use of phrases and words that are likely to trigger a bloc or a filtering criterion against spam. Conversely, if the Email rules and filters that apply to the content are too restrictive, some desired Email which the recipient would have liked to receive will get blocked or filtered out. (This is the reason that some of the filtering programs allow the user to review the Email that has been filtered or blocked—however, if the user needs to perform a review, this defeats the very purpose of the filtering software.)

It takes time and effort for the individual user to prioritize incoming Emails into multiple folders based on such rules.

SUMMARY OF THE INVENTION

Briefly, the present invention comprises in one embodiment, an Email guarantee deposit method, comprising the steps of: receiving from a sender a request to send to a recipient an Email; receiving a deposit or an authorization to obtain a deposit of something of value; sending the Email to the recipient only if a deposit of authorization for a deposit is received; determining if the recipient has accepted the deposit; and if the recipient has accepted the deposit, then facilitating the disposal of the deposit.

In a further aspect of the present invention, the facilitating step includes the step of exercising the authorization to obtain the deposit.

In a further aspect of the present invention, the step is provided of maintaining a directory of Email addresses; and obtaining an Email address for the recipient from the directory.

In a further aspect of the present invention, the steps are provided of: before the sending step, correlating the deposit with a threshold value set by the recipient; and only performing the sending step if the deposit equals or exceeds the threshold value set by the recipient.

In a further embodiment of the present invention, an Email address access method is provided, comprising the steps of: receiving from a sender a request to send to a recipient an Email; receiving a payment or an authorization to obtain a deposit of something of value; determining if the deposit equals or exceeds a threshold value; and if the payment equals or exceeds the threshold payment, then sending the Email to the recipient.

In a further aspect of the present invention, the step is provided of sending at least part of the threshold payment to the recipient.

In a further embodiment of the present invention, a program product is provided for an Email guarantee deposit method, comprising machine-readable program code for causing a machine to perform the following method steps: receiving from a sender a request to send to a recipient an Email; receiving a deposit or an authorization to obtain a deposit of something of value; sending the Email to the recipient only if a deposit of authorization for a deposit is received; determining if the recipient has activated the deposit; and if the recipient has accepted the deposit, then facilitating the disposal of the deposit.

In a further embodiment of the present invention, an Email guarantee deposit system is provided, comprising: a component for receiving from a sender a request to send to a recipient an Email; a component for receiving a deposit or an authorization to obtain a deposit of something of value; a component for sending the Email to the recipient only if a deposit of authorization for a deposit is received; a component for determining if the recipient has accepted the deposit; and a component for, if the recipient has accepted the deposit, then facilitating the disposal of the deposit.

In a further embodiment of the present invention, an Email guarantee deposit method is provided, comprising the steps of: receiving from a sender a request to send to a recipient an Email with a visual or auditory signal or with other emphasis or to route the Email to designated type of device; receiving a deposit or an authorization to obtain a deposit of something of value; sending the Email to the recipient with such a visual or auditory signal or other emphasis or routing the Email to the designated type of device only if a deposit of authorization for a deposit is received; determining if the recipient has accepted the deposit; and if the recipient has accepted the deposit, then facilitating the disposal of the deposit.

In a further embodiment of the present invention, an Email address access method is provided, comprising the steps of: receiving from a sender a request to send to a recipient an Email with a visual or auditory signal or with other emphasis or routed to a designated type of device; receiving a payment or an authorization to obtain a deposit of something of value; determining if the deposit equals or exceeds a threshold value; and if the payment equals or exceeds the threshold payment, then sending the Email with said signal or emphasis to the recipient.

In a further embodiment of the present invention, a program product is provided for an Email guarantee deposit method, comprising machine-readable program code for causing a machine to perform the following method steps: receiving from a sender a request to send to a recipient an Email with a visual or auditory signal or with other emphasis or routed to a designated type of device; receiving a deposit or an authorization to obtain a deposit of something of value; sending the Email with said signal or emphasis to the recipient only if the deposit or authorization for the deposit is received; determining if the recipient has activated the deposit; and if the recipient has accepted the deposit, then facilitating the disposal of the deposit.

In a further embodiment of the present invention, an Email guarantee deposit system is provided, comprising: a component for receiving from a sender a request to send to a recipient an Email with a visual or auditory signal or with other visual emphasis or routing to a designated type of device; a component for receiving a deposit or an authorization to obtain a deposit of something of value; a component for sending the Email with said visual or auditory signal or emphasis to the recipient or routing the Email to the designated device; a component for determining if the recipient has accepted the deposit; and a component for, if the recipient has accepted the deposit, then facilitating the disposal of the deposit.

DETAILED DESCRIPTION OF THE PREFERRED EMBODIMENT

Figure 1:
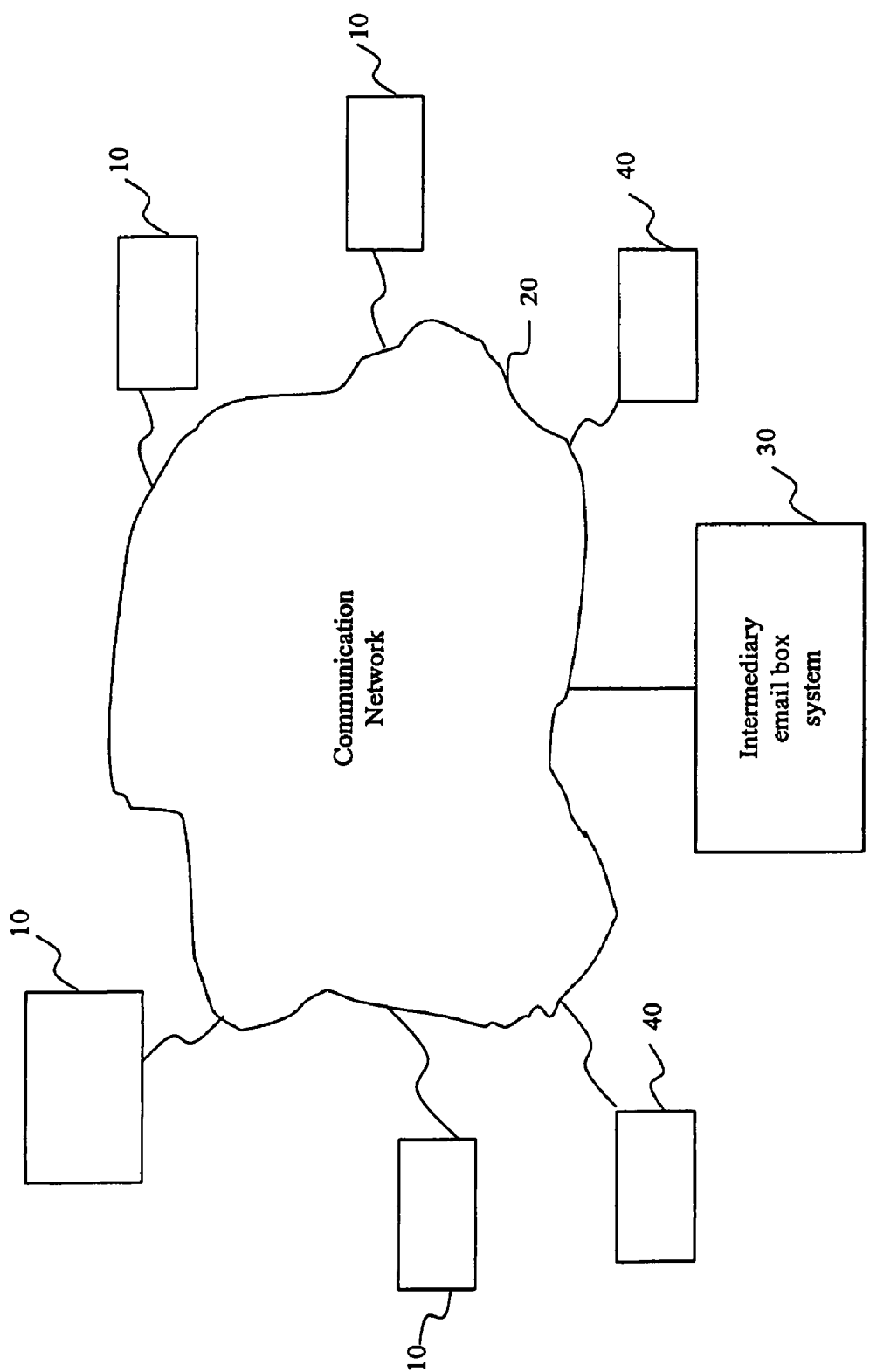
FIG. 1 is a schematic block diagram of an overall context for the present invention.

The present invention solves the foregoing problems, in one embodiment, by allowing users/potential recipients to grant others the right to send the users Emails on the condition that any sender of an Email pays a fee in the event that the user/recipient considers the Email to be an unwanted intrusion. This fee will deter most senders of unwanted commercial Emails ("spam").

Users who wish to grant others access to their Email inbox, publish a permanent "intermediary" Email address which is different from their primary Email inbox. The term "intermediary Email box" is intended to be construed broadly to include any kind of conceivable device or receiving area, with or without storage, that processes an incoming message and rejects the message or rejects a request for additional mailing rights if the message does not come with a requisite deposit.

Alternatively, instead of publishing an intermediary address, users could simply publish a link at a website through which others could have access to that intermediary Email address by clicking on it and typing the text of the Email into a pre-set form.

Emails received at the intermediary inbox are forwarded to the recipient's primary Email address only if the sender insures the mailing with a deposit or an authorization for a deposit of something of value. There may be a threshold pre-set by the user/recipient or the system and published with his/her Email address, which must be met. The recipient can waive or accept payment of this deposit fee at his option, or the deposit can be made automatically.

The directory aspect of the present invention can also be setup for the explicit purpose of inviting senders to pay for access to the user's Email inbox. Note that in a preferred embodiment, the user's primary Email address is never disclosed during the process.

Another embodiment of the present invention allows the mailing to a transit Email address even without a guarantee deposit but only for the purpose of requesting mailing rights and subject to strong restrictions regarding the amount of text in the message: The system could be set to allow the requester to only input his name, the standard request for mailing rights itself and, possibly, a very limited number of words (in one embodiment, not more than 3 to 5 words in a confined space) that will help the recipient recognize the sender in the event the recipient does not recognize the sender by his name alone (for instance, "Schwab investment advisor met yesterday" would let the recipient know that the person requesting the mailing rights is the Schwab Corporation Investment Advisor whom he/she met at a party on October 30 and to whom he/she had expressed an interest in learning more about potential investments.) Such a request would be made in a pre-set format. This mechanism would allow non-spammers to make such requests for mailing rights while restricting the ability of spammers to use the directory to send commercial messages.

Another way of implementing the invention is to allow users to specify that they only wish to receive Emails without a deposit from a certain list of pre-determined Email addresses. By default, Emails that arrive from any other Email address are sent back to the sender with a notice that they must be insured in the above described manner before they will be relayed to the primary Email inbox of the recipient. If the sender then insures the Email, the recipient could have the additional option of adding the senders' Email address to his/her list of approved Email addresses from which he/she can receive Emails even if they are not insured. In this manner of using the invention, a user would be able to freely and widely publish his primary Email address rather than a secondary Email address without fear of receiving excessive spam.

Yet another implementation of the invention is to make other or additional mailing rights contingent on the submission of a deposit. Separately or additionally, deposits would be required to send an Email that is not only placed in the Email inbox of a recipient but that alerts the recipient of a particularly urgent communication at the time that the Email arrives in the Inbox with an auditory or visual signal. Alternatively, Emails that are insured in this manner with a special deposit could be visually emphasized or ranked higher in a particular Email inbox so as to be read first and be more likely to command the attention of the recipient. Similarly, to the other implementation methods above, the recipient would have the option of accepting the deposit in the event that he or she deems the interruption or the additional emphasis inappropriate, intrusive or unjustified. A deposit could also be required to route an Email to the handheld personal digital assistant or to the cellular phone of the recipient instead of to the regular Email inbox which he normally accesses through his computer. To route an Email to a hand-held device such as a PDA or a Cell phone or to add auditory or visual interruption signals, a particular recipient would presumably require higher deposits than those that are required for the mailing of a regular Email that goes to the standard Email inbox. Note that such additional contingent mailing rights do not have to be granted indiscriminately to anyone willing to make the required deposit, but could be made available selectively to certain groups of individuals, such as those working at a particular company.

Referring now to FIG. 1, there is shown a schematic block diagram illustrating the high level components of an overall system configuration for implementing a preferred embodiment of the present invention. A plurality of client computer systems 10 are connected through a communications network 20. Each of the plurality of the client computer systems 10 could include portions of the processing software to be discussed below. Each of a plurality of the client computer systems 10 is connected through the communications network 20 to one or more processors 30 that contain the processing software to be described to implement the Email box system of the present invention. It is contemplated that there be a one or more data bases for storing communications information about the various clients 10 may be maintained at one or more of the processors 30. Additionally, it is contemplated that one or more vendor computers 40 will be connected to the communications network 20.

In a preferred embodiment, the communications network 20 is the Internet. The term "Internet" is defined to mean a collection of interconnected or disconnected networks (public and/or private) that are linked together by a set of standard protocols (such as TCP/IP, for example) to form a global, distributed network. While this term is intended to refer to what is now commonly known as the Internet, it is also intended to encompass variations which may be made in the future, including changes and additions to existing standard protocols.

However, the communications network 20 can also include a wide area network (WAN), an internet network, a public tariff telephone network or a private value added network (VAN). Alternatively, the communication network can be implemented using any combination of these different kinds of communication networks. It will be appreciated that many other similar configurations are within the abilities of one skilled in the art and all of these configurations could be used with the method of the present invention. Furthermore, it should be recognized that the computer system and network disclosed herein can be programmed and configured in a variety of different manners by one skilled in the art, to implement the method steps discussed further herein.

The client blocks 10 in FIG. 1 are conveniently configured as computers which may communicate with the communications network 20. However, the present invention is not limited to the use of computers. In this regard, a variety of convenient mechanisms can be used to implement the client 10, including hand held devices. More generally, a client can be a PC, telephone, PDA, appliance, etc. equipped with an industry-standard (HTTP, FTP, WAP, HTML, XML, WML, cHTML, HDML, etc.) browser or other communications protocol having wired (Ethernet, Token Ring, etc.) or wireless (cellular, Bluetooth, IEEE 802.11b, etc.) access via networking (UPnP, TCP/IP, Novell, NetBUI, Appletalk, etc.) to nearby and/or remote peripherals, devices, appliances, etc. The preferred embodiment will focus upon a device that utilizes the TCP/IP (transfer control protocol/Internet protocol) for communication between clients or between clients and servers, each client device having an internal TCP/IP/ hardware protocol stack, where the "hardware" portion of the protocol stack could be Ethernet, Token Ring, Bluetooth, IEEE 802.11b, or whatever software protocol is needed to facilitate the transfer of IP packets over a local area network.

If the blocks 10 are implemented as computers, they would typically include customary components of a computer system including a CPU, a display, a keyboard and/or other I/O device, a network card or other communications interface, RAM or ROM or other memory, as well as storage such as disks and/or CDROM drives. (However, the client may be other browser equipped or communication program equipped devices as described above.) The monitor may be any conventional off-the-shelf monitor. The preferred operating system is Windows 2000 or XP. As noted in the preferred embodiment, within each personal computer, an internet browser such as Netscape or Internet Explorer is stored for use. Also in the preferred embodiment, the browser is linked to network 20 via the TCP/IP protocol stack.

Likewise, the blocks 40 representing the vendors and others wishing to communicate with the clients 10, will also typically be implemented by means of a computer, but could be implemented by hand held devices or other convenient devices.

The processor 30 is representative only, and may be comprised of a single processor. Alternatively, the functionality of the processing system could be implemented with several processor systems that are connected over a network. It is also possible to distribute the functionality of the processing system over a multitude of sites which are suitably connected together using conventional networking or inter-networking techniques.

In a preferred embodiment, the Email system of the present invention may be provided by a web service which includes the processor 30. The term "web service" is intended to refer to a service that is provided (at least in part) by a web server. But a web service is a broader concept than a web server. In this regard, a web server is a program that, utilizing the client/server model and the World Wide Web Hypertext Transfer Protocol, serves files that form Web pages to web users whose computers contain HTTP clients that forward their requests. Every computer on the Internet that contains a Web site must have a Web server program. The most popular web servers currently are Microsoft's Internet Information Server which comes with the Windows NT server, Netscape Fast Track and Enterprise servers, and Apache, a Web server popular on UNIX-based operating systems (but available for Windows as well). Web servers often come as part of a larger package of Internet and Intranet-related programs for serving e-mail, downloading requests for File Transfer Protocol files, and building and publishing Web pages. It is this larger package which is referred to as the web service.

Typically a web service will include a Web site which corresponds to a particular Internet domain name, such as "Landesmann.com", and includes the web content associated with one or more particular operations. The term "Web site" is generally intended to encompass both (i) the hardware/software server components that serve informational content over the network, and (ii) the "back end" hardware/ software components, including any non-standard or specialized components, that interact with the server components to perform services for the Web site user.

Figure 2:
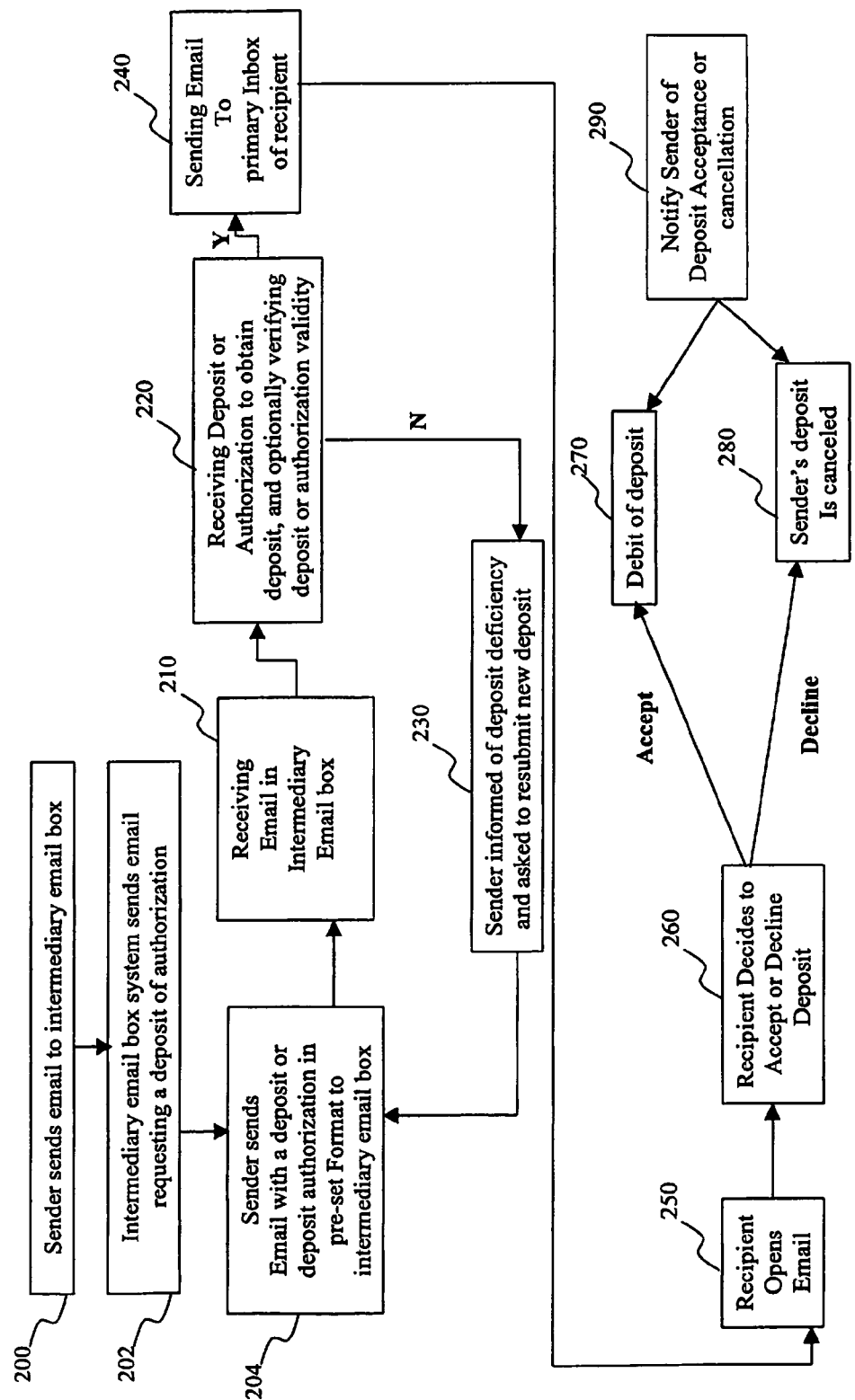
FIG. 2 is a flowchart of a preferred embodiment of the present invention.

Referring now to FIG. 2, an embodiment for one aspect of the present invention is illustrated.

The process may be initiated by a sender obtaining an Email box address for a particular user/recipient. This might be a secondary intermediary Email address of the recipient which the recipient has made available directly or indirectly to the sender, and which is different from the recipient's primary Email address. The sender sends the Email to this address. This is illustrated by block 200. In block 202, the Email box system receives this Email from the sender and instead of placing or forwarding the Email into the inbox of the recipient, sends in response an Email requesting a deposit or an authorization for a deposit. Typically, this deposit will be for a pre-set threshold amount.

In block 204, the sender sends an Email with a deposit or a deposit authorization in a preset format. Note that the term "Email" is intended to encompass any type of network communication. The sender would send his Email to the intermediary Email box at the processor 30, which effectively acts as a bridge or triage and transit station for the Email, and operates to relay the Email to the sender under certain conditions, but not under other conditions. Note that after the sender has the correct intermediary Email box address and the correct threshold amount and any pre-set format for the communication, blocks 200 and 202 can be bypassed when the sender wishes to send another Email to the same recipient.

In block 210, the intermediary Email box receives the Email from the sender. This block 210 includes one or more subsidiary steps. As noted, the system is set up with a pre-set threshold deposit requirement. This pre-set threshold deposit requirement may be a standard deposit value set by the system. Alternatively, the pre-set deposit value could be set by the user/recipient. In the situation where the user/recipient has pre-set the threshold value for the deposit, in block 220 the user's pre-set threshold must be obtained. Typically, the user's pre-set threshold value would be associated with the user's intermediary Email address. Alternatively, the user's intermediary Email address could be used as a reference to access this pre-set threshold value.

Accordingly, the block 210 would determine whether the deposit or the authorization for the deposit is for a value which equals or exceeds the threshold value which has been pre-set by the user/recipient or the system. Another optional step could be performed in block 210 if the intermediary Email box is provided with an expiration date. In this instance, the date of the sender's Email could be compared with the expiration date of the intermediary Email box, and the process would continue only if the sender's Email date is prior to the expiration date of the intermediary Email box.

Note that block 210 could also include a subsidiary step of comparing the sender's Email address to a list of Email addresses that the recipient will accept without the payment of a deposit. Accordingly, the deposit process can be bypassed for a selected set of senders designated by the recipient. The populating of such a list of senders could be accomplished during the setup of the intermediary Email box by the recipient, and may also be performed on an ad hoc basis as the recipient determines that this privilege should be extended to a new sender.

Senders who frequently send Email to intermediary Email boxes could keep a copy of the form that is sent by the intermediary web site on their hard drives or in other convenient storage so that this form could be pre-completed with payment information (credit card or micro payment account, for example). This pre-completed payment form would speed-up the process of sending of Emails. Alternatively, the sender's Email outbox could be linked to an account of the sender held by the company administering the intermediary Email box service. This account could be automatically debited whenever the sender makes a request to send an Email to a recipient through this intermediary Email box.

In block 220, the deposit or an authorization for a deposit of something of value, typically money, is received at the intermediary Email site. The deposit could be by means of a credit card number or a debit card number, for example. Note that the recitation "intermediary" Email box in this context is also intended to encompass other designated locations where the deposit or the authorization for the deposit might be sent, with a verification message sent to the intermediary Email box.

In block 230, if it has been determined that the deposit or the authorization for the deposit does not equal or exceed the pre-set threshold or if the deposit or authorization for deposit cannot be verified, then a message is sent to the sender informing him/her of the deficiency in his/her deposit and requesting a resubmittal of a new deposit.

Alternatively, if the deposit or authorization for the deposit has been verified and does equal or exceed any optional pre-set threshold value, then in block 240 the Email is sent to the primary inbox of the recipient.

In the event that other mailing rights are authorized as the result of the deposit, such as routing the Email to the personal digital assistant or cell phone of the recipient or alerting the recipient with a visual or auditory signal, the particular action that has been authorized as a result of the deposit is then taken in block 240.

In block 250, the recipient opens his Email. In block 260, the recipient decides whether to accept or decline the guaranteed deposit payment. In order to implement this step, by way of example the forwarded Email could be provided with web content to display buttons labeled "Accept" and "Decline," with hyperlinks to appropriate network locations.

Referring to block 270, if the user clicks the "Accept" button, then the deposit may be debited. Note that the debiting of the deposit may be made to the user/recipient's account, or to any other selected account. By way of example, the debit could be made to a charity, for example.

Alternatively, if the user/recipient clicks the button "Decline", then in block 280 the sender's deposit or authorization for deposit may be canceled.

In block 290, the system automatically sends a message to the sender notifying the sender of the recipient's acceptance or cancellation decision for the deposit.

It should be noted that a default decision may be set by the user for deposits in block 260. In this regard, the default could be set to automatically accept all deposits. Alternatively, the default could be set to automatically decline all deposits.

Figure 3:
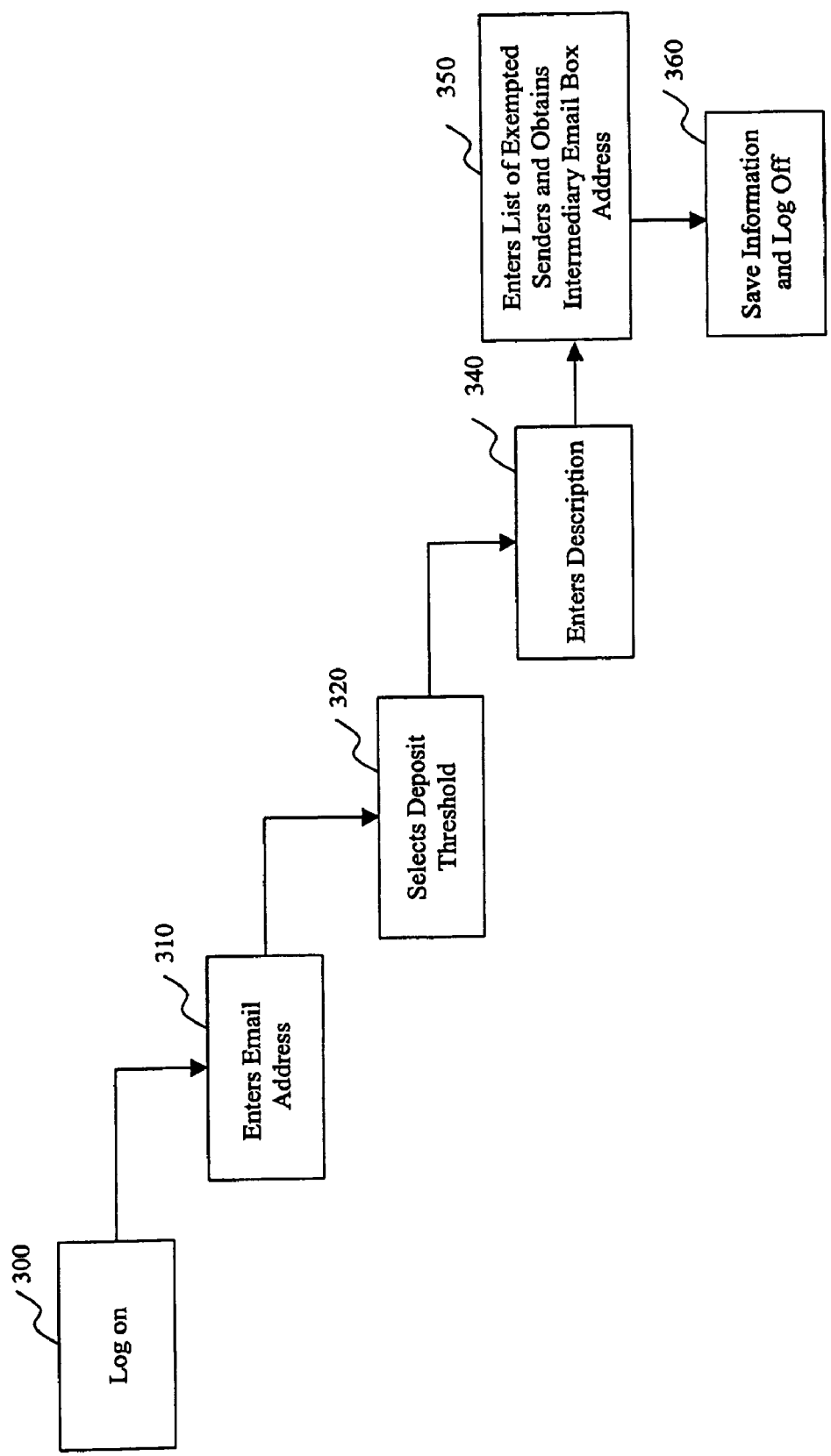
FIG. 3 is a flowchart of a preferred embodiment of another aspect of the present invention.

Referring now to FIG. 3, there is shown a preferred embodiment for a setup of the contingent mailing rights by the recipient. In this embodiment, the directory system is operated by one or more servers on one or more web sites. A user would access the web site by inputting the appropriate Internet address into the user's browser. The user would then log on to the web site in block 300. In block 310, the user enters the user's primary Email address. In the event that the user's primary Email address has previously been stored in the data base for the web site, the field for the user's primary Email address may be pre-populated with his/her primary address. Typically, this might occur where the user wished to perform some management function with respect to the settings for his intermediate Email box.

Referring now to block 320, the user selects the amount of the deposit to be requested from potential senders. In one aspect of the implementation for block 320, the user could provide different deposit requirements for different senders, or different types of senders. For such an implementation, block 320 would provide web content for receiving input from the user for a plurality of deposit threshold values, and the senders or type of senders that those different threshold values would apply to. For example, the user may require a different higher deposit before an auditory or visual enhancements may be activated by a sender. The user may set an even higher deposit threshold to be paid before routing to the user's cell phone or PDA may be activated by a sender.

Note that if an enhanced version of the system is set up for the user/recipient, wherein different levels of threshold deposit values have been set for different senders or different types of senders, then when an Email from a sender is received by the intermediary Email box system, then in block 202 the intermediary Email box system determines the appropriate threshold deposit level for that particular sender or class of senders by means of comparison to a table of senders or via another convenient method, and then sends the appropriate threshold deposit level information back to the sender. The appropriate threshold deposit level is then used in block 210 to determine whether the deposit amount or authorization for the deposit sent by the sender equals or exceeds this threshold deposit value.

In block 340, the user inputs a description of himself/ herself and the user's background. This information may be used for the purpose of distinguishing between several people with the same or similar names, so that a user of the Email will not send an Email to a person other than the intended recipient. At the option of the user/recipient, this information could also be used for other market-driven purposes.

In block 350, the user may be prompted by web content on his browser to enter a list of exempted senders, who would be exempted from the deposit requirements. In this block or an earlier block the user may select an intermediary Email box address or may be given an intermediate Email address by the system.

In block 360, the user would then save this information and log off.

Figure 4:
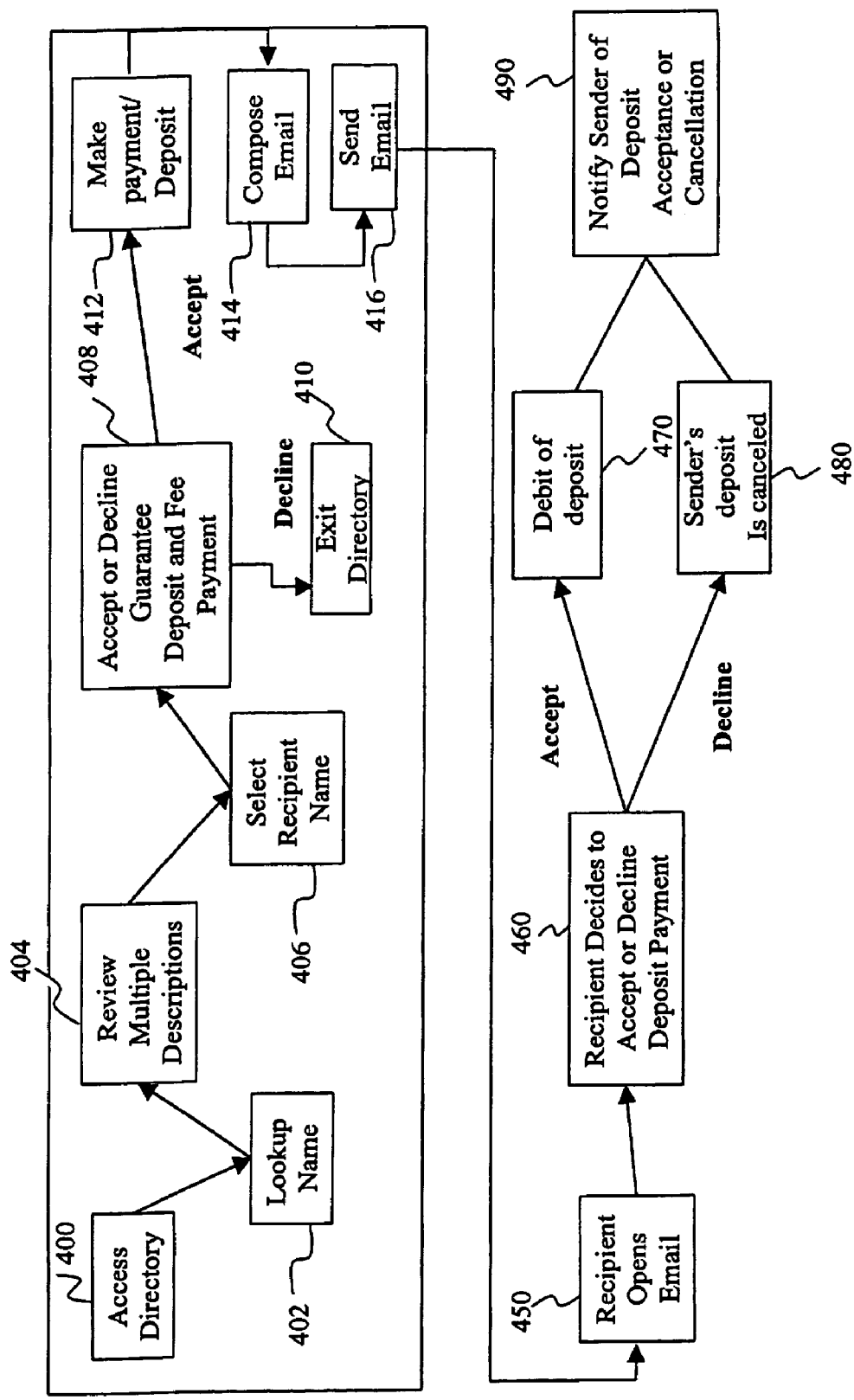
FIG. 4 is a flowchart of a method for using a preferred embodiment of the directory invention.

Referring now to FIG. 4, there is shown a preferred embodiment for one aspect of the present invention. FIG. 4 shows a description of the operation of the system by a sender who wishes to send an Email to another person by accessing a directory at the web site. In block 400, the sender accesses the directory at the web site by logging on to the web site service and selecting a directory feature. In block 402, the sender looks up the name for his desired recipient. In block 404, in a situation where there are multiple recipients with similar names, the user may access the description for a particular user to ensure that it is addressing the Email to the appropriate intermediary Email box. In block 406, the sender selects the appropriate recipient's name. Typically, this selection would be accomplished by clicking on the name. In block 408, the sender would then be presented via appropriate web content with a screen which describes the deposit requirement for normal routing to the intermediary Email box, as well as options (if any) for Email enhancements or special routing (to be discussed below) and the required deposit amounts therefor, and acceptable payment mechanisms, and presents a set of buttons, or other appropriate means for the sender to Accept or Decline the deposit. If the sender declines the deposit requirement, then in block 410, the directory is exited.

In more detail, these Email enhancement in block 408 might include web content to provide a screen or other user interface for offering a method of alerting the recipient of the particular Email with an auditory and/or visual signal, which would be presented to the user at a convenient time, typically during processing of the user's Email. For example, program code could be added to cause an auditory beep or other sound or words to be made at a predetermined time to the user, and/or a highlighting of the Email visually, or the addition of words, or icons, or designs to indicate urgency for this particular Email. Alternatively or in addition, the Email could be ranked higher in the Email box so as to be read earlier than its receipt time would entitle it. Alternatively, or in addition, a selection screen could be presented to sender to route the Email additionally to or only to another Email receiving device, such as a hand-held device like a PDA or a cell phone, with or without auditory or visual enhancement. As noted above, additional deposits or different deposits may be required for adding one or more Email enhancements or for routing the Email to selected other devices, such as hand-held devices.

Alternatively, note that the present invention may also be set up to pass all Emails to the recipient, with enhancement of the Email or the routing of the Email to selected other devices only occurring if the requisite deposit is received.

If the sender accepts the deposit requirements by making the appropriate indications on his screen, then in block 412, the sender is presented by the appropriate web content, with a screen to provide account information for making payments of the deposit or providing an authorization to obtain a deposit.

In block 414, the sender then composes his/her Email and in block 416, the sender sends the Email which—assuming that the deposit is sufficient—is relayed to the Email inbox of the desired recipient. In the event that other mailing rights are authorized as the result of the deposit, such as routing the Email to the personal digital assistant or cell phone of the recipient or alerting the recipient with a visual or auditory signal, then in block 416 program code is added to facilitate at the appropriate time the particular action that has been authorized as a result of the deposit.

The operation of blocks 450, 460, 470, 480, and 490, may be substantially as described for FIG. 2.

Note that the option for enhanced Email described above for FIG. 4 may also be implemented for FIG. 2. It should be noted that the amount of the deposit may include a fee for the operation of the intermediary Email box system.

As noted earlier, the insurance deposit payment generally will be paid to the recipient in the event that he accepts the payment but that is not necessarily the case. The payment could also go to charity or to another third party on whose behalf the recipient could accept the deposit. The main purpose of the deposit is to deter senders of unwanted commercial Emails from using the directory.

As noted above, people are reluctant to publish their Email addresses in publicly available directories. In accordance with one embodiment of the present invention, individuals may publish a permanent or temporary "intermediary" Email address which is different from their primary Email inbox. Emails going to that intermediary inbox are forwarded to the recipient's primary Email address only if the sender insures the mailing with a deposit fee, at a threshold set by the recipient or the system and published with his/her Email address. The recipient can waive this fee at his/her option.

The directory aspect of the present invention can also be setup for the explicit purpose of inviting senders to pay for access to one's Email inbox. Prominent individuals and community leaders can make their Email inboxes (and by extension, themselves) available for a fee.

Another embodiment of the directory aspect of the present invention is that it allows mailing to an intermediary Email address even without a guarantee deposit but only for the purpose of requesting mailing rights and subject to strong restrictions regarding the amount of text in the message: The requestor can only give his name, a standard request for mailing rights itself and, possibly, a very limited number of words (probably not more than 3 to 5 words) that will help the recipient recognize the sender for those situations where the recipient does not recognize the sender by his/her name alone (for instance, "Schwab investment advisor met yesterday," would let the recipient know that the person requesting the mailing rights is the Schwab Corporation Investment Advisor whom he/she met at a party on October 30 and to whom he/she had expressed an interest in learning more about potential investments.) Such a request would be made in a pre-set format. This mechanism would allow non-spammers to make such requests for mailing rights while restricting the ability of spammers to use the directory to send commercial messages.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen, and more generally, on designer choice. It is understood that all such variations are within the scope of the invention. Likewise, software and web implementation of the present invention could be accomplished with standard programming techniques with rule based logic and/or other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of a preferred embodiments of the invention has been presented for purposes of illustration and description. It is not intended to be exhaustive nor to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A network communication opt-in request method for operating a system, comprising:
   receiving by the system from an opt-in requester a request to send to a recipient an opt-in request including text associated with the opt-in request, wherein the opt-in request is a request to grant mailing rights to send subsequent network communications to the recipient;
   receiving by the system a payment or a payment promise associated with the opt-in request from or on behalf of the opt-in requester, or verification that a payment or payment promise has been made by or on behalf of the opt-in requester;
   evaluating by the system whether or not the following requirements are met: whether the payment or payment promise meets or exceeds a threshold value requirement and whether or not the text meets or is less than a maximum text size requirement;
   sending or sending in a particular manner the opt-in request to an inbox of the recipient depending at least in part on whether or not both requirements are met;
   evaluating information generated after receipt of the opt-in request by the recipient inbox, the information consistent with a decision by the recipient to approve or not to approve the opt-in request, said decision having been made subsequent to the receipt of the opt-in request by the recipient inbox; and
   communicating said approval or non-approval to the opt-in requester.

2. The method as defined in claim 1, further comprising:
   establishing the threshold value requirement for the payment or payment promise which must be paid or agreed to be paid by the opt-in requester for relaying an opt-in request to the recipient inbox; and
   establishing the maximum text-size requirement which cannot be exceeded by opt-in requesters for relaying an opt-in request to the recipient inbox.

3. The method as defined in claim 2, wherein the threshold value requirement or the maximum text-size requirement are received from or on behalf of the recipient.

4. The method as defined in claim 1, further comprising accessing a list of accepted senders;
   determining if the opt-in requester is on the list of accepted senders; and
   executing the sending step if the sender is on the list of accepted senders regardless of whether the payment or payment promise is received.

5. The method as defined in claim 1, further comprising obtaining information from the recipient after the sending step is executed, said information being consistent with a decision by the recipient to add the opt-in requester to a list of accepted senders; and
   sending or sending in a particular manner subsequent network communications from the sender to the recipient while not sending or not sending in the particular manner at least some subsequent network communications from at least some senders not on the list of accepted senders.

6. The method as defined in claim in claim 1, further comprising:
   receiving an instruction from the recipient to remove the opt-in requester from a list of accepted senders; and
   removing the opt-in requester from the list of accepted senders.

7. The method as defined in claim 1,
   wherein the threshold value requirement is lower for certain classes of senders.

8. The method as defined in claim in claim 1, further comprising building a list of blocked senders, and not sending or not sending in a particular manner an opt-in request from blocked senders to the recipient inbox regardless of whether or not said opt-in request meets the requirements.

9. The method as defined in claim 1, further comprising dispensing at least part of the payment to the recipient.

10. The method as defined in claim 1, further comprising dispensing at least part of the payment to a charity.

11. The method as defined in claim 1, further comprising maintaining a directory of recipients that are willing to receive opt-in requests.

12. The method as defined in claim 11, further comprising:
    providing an interface for accessing the directory of recipients; and
    presenting on the interface a form for adding the text.

13. The method as defined in claim 11, wherein said directory comprises information about the recipients.

14. The method as defined in claim 1, further comprising
    obtaining information from the recipient after the sending step is executed, said information being consistent with a decision by the recipient to add the opt-in requester to a list of accepted senders; and
    sending subsequent network communications from the sender to a primary inbox of the recipient while not sending at least some subsequent network communications from at least some senders not on the list of accepted senders.

15. The method as defined in claim 1, further comprising
    obtaining information from the recipient after the sending step is executed, said information being consistent with a decision by the recipient to add the opt-in requester to a list of accepted senders; and
    not filtering subsequent network communications from the sender to the recipient for content, while filtering for content at least some subsequent network communications from at least some senders not on the list of accepted senders.

16. The method as defined in claim 1, wherein the sending or sending in a particular manner the opt-in request comprises sending or sending in a particular manner the opt-in request in a pre-set format to the inbox of the recipient.

17. A program product for a network communication opt-in request method for operating a system, comprising:
    one or more computer usable media having computer readable program code embodied therein, to be executed by a computer, the computer readable program code comprising:
    program code for receiving from an opt-in requester a request to send to a recipient an opt-in request including text associated with the opt-in request, wherein the opt-in request is a request to grant mailing rights to send subsequent network communications to the recipient;

program code for receiving a payment or a payment promise associated with the opt-in request from or on behalf of the opt-in requester, or verification that a payment or payment promise has been made by or on behalf of the opt-in requester;

program code for evaluating whether or not the following requirements are met: whether the payment or payment promise meets or exceeds a threshold value requirement and whether or not the text meets or is less than a maximum text size requirement;

program code for sending or sending in a particular manner the opt-in request in a pre-set format to an inbox of the recipient depending at least in part on whether or not both requirements are met;

program code for evaluating information generated after receipt of the opt-in request by the recipient inbox, the information consistent with a decision by the recipient to approve or not to approve the opt-in request, said decision having been made subsequent to the receipt of the opt-in request by the recipient inbox; and communicating said approval or non-approval to the opt-in requester.

18. The program product as defined in claim 17, further comprising:

program code for establishing the threshold value requirement for the payment or payment promise which must be paid or agreed to be paid by the opt-in requester for relaying an opt-in request to the recipient inbox; and program code for establishing the maximum text-size requirement which cannot be exceeded by opt-in requesters for relaying an opt-in request to the recipient inbox.

19. The program product as defined in claim 17, wherein at least one of the program code for establishing the threshold value requirement and the program code for establishing the maximum text-size requirement is designed to receive the requirement from or on behalf of the recipient.

20. The program product as defined in claim 17, further comprising program code for accessing a list of accepted senders;
program code for determining if the opt-in requester is on the list of accepted senders; and
program code for executing the sending step if the sender is on the list of accepted senders regardless of whether the payment or payment promise is received.

21. The program product as defined in claim 17, further comprising program code for obtaining information from the recipient after the sending step is executed, said information being consistent with a decision by the recipient to add the opt-in requester to a list of accepted senders, and
program code for sending or sending in a particular manner subsequent network communications from the sender to the recipient while not sending or not sending in the particular manner at least some subsequent network communications from at least some senders not on the list of accepted senders.

22. The program product as defined in claim in claim 17, further comprising program code for receiving an instruction from the recipient to remove the opt-in requester from a list of accepted senders; and program code for removing the opt-in requester from the list of accepted senders.

23. The program product as defined in claim 17, wherein the threshold value requirement is lower for certain classes of senders.

24. The program product as defined in claim in claim 17, further comprising program code for building a list of blocked senders, and not sending or not sending in a particular manner an opt-in request from blocked senders to the recipient inbox regardless of whether or not said opt-in request meets the requirements.

25. The program product as defined in claim 17, further comprising program code for dispensing at least part of the payment to the recipient.

26. The program product as defined in claim 17, further comprising program code for dispensing at least part of the payment to a charity.

27. The program product as defined in claim 17, further comprising program code for maintaining a directory of recipients that are willing to receive opt-in requests.

28. The program product as defined in claim 27, further comprising program code for providing an interface for accessing the directory of recipients, and presenting a form for adding the text.

29. The program product as defined in claim 27, wherein said program code for maintaining the directory facilitates display of information about the recipients.

30. The program product as defined in claim 17, further comprising program code for obtaining information from the recipient after the sending step is executed, said information being consistent with a decision by the recipient to add the opt-in requester to a list of accepted senders; and
program code for sending subsequent network communications from the sender to a primary inbox of the recipient while not sending at least some subsequent network communications from at least some senders not on the list of accepted senders.

31. The program product as defined in claim 17, further comprising program code for obtaining information from the recipient after the sending step is executed, said information being consistent with a decision by the recipient to add the opt-in requester to a list of accepted senders; and
program code for not filtering subsequent network communications from the sender to the recipient for content, while filtering for content at least some subsequent network communications from at least some senders not on the list of accepted senders.

32. The program product as defined in claim 17, wherein the program code for sending or sending in a particular manner the opt-in request provides the opt-in request in a pre-set format to the inbox.

33. A network communication opt-in request system, comprising:

one or more processors for implementing the following components:

a component for receiving from an opt-in requester a request to send to a recipient an opt-in request including text associated with the opt-in request, wherein the opt-in request is a request to grant mailing rights to send subsequent network communications to the recipient;

a component for receiving a payment or a payment promise associated with the opt-in request from or on behalf of the opt-in requester, or verification that a payment or payment promise has been made by or on behalf of the opt-in requester;

a component for evaluating whether or not the following requirements are met: whether the payment or payment promise meets or exceeds a threshold value requirement and whether or not the text meets or is less than a maximum text size requirement;

a component for sending or sending in a particular manner the opt-in request to an inbox of the recipient depending at least in part on whether or not both requirements are met;

a component for evaluating information generated after receipt of the opt-in request by the recipient inbox, the information consistent with a decision by the recipient to approve or not to approve the opt-in request, said decision having been made subsequent to the receipt of the opt-in request by the recipient inbox; and a component for communicating said approval or non-approval to the opt-in requester.

34. The system as defined in claim 33, further comprising:

a component for establishing the threshold value requirement for the payment or payment promise which must be paid or agreed to be paid by the opt-in requester for relaying an opt-in request to the recipient inbox; and a component for establishing the maximum text-size requirement which cannot be exceeded by opt-in requesters for relaying an opt-in request to the recipient inbox.

35. The system as defined in claim 33, wherein at least one of the component for establishing the threshold value requirement or the component for establishing the maximum text size requirement facilitates receipt of its respective requirement from or on behalf of the recipient.

36. The system as defined in claim 33, further comprising a component for accessing a list of accepted senders;

a component for determining if the opt-in requester is on the list of accepted senders; and a component for executing the sending step if the sender is on the list of accepted senders regardless of whether the payment or payment promise is received.

37. The system as defined in claim 33, further comprising a component for obtaining information from the recipient after a sending step is executed by the sending component, said information being consistent with a decision by the recipient to add the opt-in requester to a list of accepted senders; and a component for sending or sending in a particular manner subsequent network communications from the sender to the recipient while not sending or not sending in the particular manner at least some subsequent network communications from at least some senders not on the list of accepted senders.

38. The system as defined in claim in claim 33, further comprising a component for receiving an instruction from the recipient to remove the opt-in requester from a list of accepted senders, and removing the opt-in requester from the list of accepted senders.

39. The system as defined in claim 33, wherein the threshold value requirement is lower for certain classes of senders.

40. The system as defined in claim in claim 33, further comprising a component for building a list of blocked senders, and not sending or not sending in a particular manner an opt-in request from blocked senders to the recipient inbox regardless of whether or not said opt-in request meets the requirements.

41. The system as defined in claim 33, further comprising a component for dispensing at least part of the payment to the recipient.

42. The system as defined in claim 33, further comprising the system dispensing at least part of the payment to a charity.

43. The system as defined in claim 33, further comprising a component for maintaining a directory of recipients that are willing to receive opt-in requests.

44. The system as defined in claim 43, further comprising a component for providing an interface for accessing the directory of recipients, and presenting a form for adding the text.

45. The system as defined in claim 43, wherein component for maintaining said directory facilitates display of information about the recipients.

46. The system as defined in claim 33, further comprising a component for obtaining information from the recipient after the sending step is executed, said information being consistent with a decision by the recipient to add the opt-in requester to a list of accepted senders; and a component for sending subsequent network communications from the sender to a primary inbox of the recipient while not sending at least some subsequent network communications from at least some senders not on the list of accepted senders.

47. The system as defined in claim 33, further comprising a component for obtaining information from the recipient after the sending step is executed, said information being consistent with a decision by the recipient to add the opt-in requester to a list of accepted senders; and a component for not filtering subsequent network communications from the sender to the recipient for content, while filtering for content at least some subsequent network communications from at least some senders not on the list of accepted senders.

48. The system as defined in claim 33, wherein the component for sending or sending in a particular manner the opt-in request sends or sends in a particular manner the opt-in request in a pre-set format to the inbox of the recipient.

* * * * *